United States Patent [19]

McHenry

[11] 3,996,035

[45] Dec. 7, 1976

[54] COATING AND HEAT STRENGTHENING GLASS SHEETS

[75] Inventor: Donald L. McHenry, Galion, Ohio

[73] Assignee: PPG Industries, Inc., Pittsburgh, Pa.

[22] Filed: Oct. 1, 1975

[21] Appl. No.: 618,608

[52] U.S. Cl. .............................. 65/60 C; 65/60 D; 427/294

[51] Int. Cl.² ........................................ C03C 17/00

[58] Field of Search ............ 65/104, 114, 115, 348, 65/351, 60 R, 60 C, 60 D; 427/294

[56] References Cited

UNITED STATES PATENTS

| | | | |
|---|---|---|---|
| 3,438,803 | 4/1969 | Dubble et al. | 65/60 R |
| 3,660,061 | 5/1972 | Donley et al. | 65/114 X |
| 3,765,859 | 10/1973 | Seymour | 65/104 |
| 3,914,119 | 10/1975 | Jack et al. | 65/104 |
| 3,925,050 | 12/1975 | Kushihashi et al. | 65/60 D |

FOREIGN PATENTS OR APPLICATIONS 220,495   8/1957   Australia ........................ 65/60 A Primary Examiner—Arthur D. Kellogg
Attorney, Agent, or Firm—Edward I. Mates

[57] ABSTRACT

Treating discrete flat glass sheets comprising heating, coating, reheating to tempering temperature and cooling to impart at least a partial temper to the coated flat glass sheets without interrupting the operation and without distorting the flatness of the individual sheets unduly while conveying said glass sheets along a continuous, straight line conveyor of the roller hearth type.

21 Claims, 6 Drawing Figures

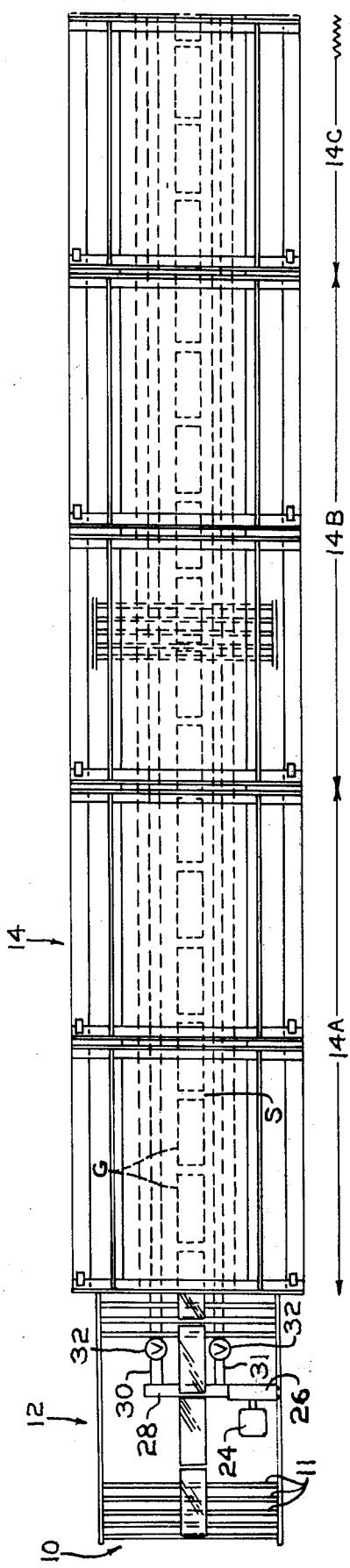

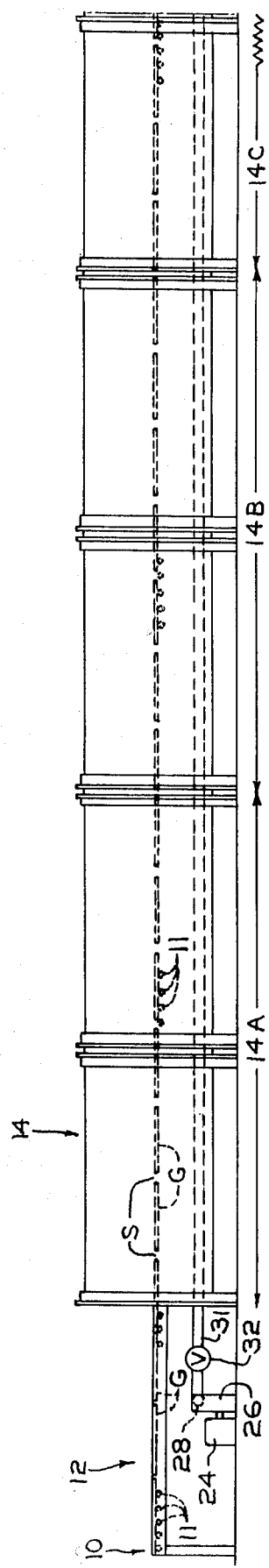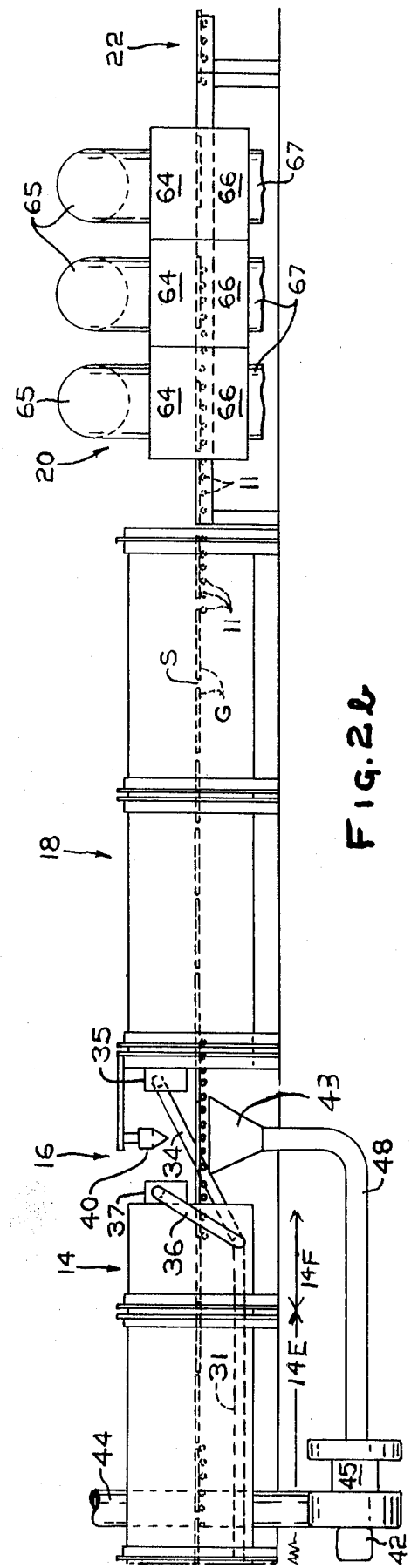

COATING AND HEAT STRENGTHENING GLASS SHEETS

BACKGROUND OF THE INVENTION

1. Field of the Invention

This invention relates to the treatment of discrete glass sheets. The present invention particularly relates to a method of coating and tempering discrete sheets of glass.

When glass sheets are cut into discrete individual sheets from a continuous ribbon, the peripheral edge of each cut glass sheet is its weakest portion and subject to breakage when the individual discrete sheets are heated and then cooled during a coating or tempering or heat-strengthening operation. In the past, individual, discrete glass sheets have been shaped, coated and at least partially tempered in a single continuous method that uses the heat required to shape the glass sheet by sagging onto a shaping mold to provide the shaped glass sheet with sufficient heat to cause a film forming composition applied onto the hot surface of the bent glass sheet to form a transparent coating on contact with said hot surface, and then chilling the bent coated glass sheet with sufficient rapidity to impose at least a partial temper thereto. Such a technique involving supporting the individual glass sheets on individual molds of the outline support type is disclosed in U.S. Pat. No. 3,762,902 to William E. Wagner and James S. Golightly, wherein sheet movement is intermittent, not continuous.

The heat needed to cause a glass sheet to sag to its desired shape prior to its coating and chilling steps has been found unsuitable for treating flat glass sheets in the past, particularly those formed on a so-called roller hearth where flat glass sheets are conveyed on spaced rotating rollers and while so conveyed are heated to an elevated temperature sufficient for tempering and then cooled rapidly until at least a partial temper is imparted to the moving flat glass sheets. A typical roller hearth type of apparatus is disclosed in U.S. Pat. No. 3,245,772 to James H. Cypher and Charles R. Davidson, Jr.

Prior to the present invention, attempts to coat flat glass sheets before chilling them to impose at least a partial temper to the flat, coated glass sheets have not been completely successful due to waviness in the glass and/or insufficient temper. The prior art considered it necessary to heat each glass sheet initially to an elevated temperature sufficient to compensate for the cooling resulting from the coating step so that the glass sheet after coating remained at a temperature sufficient for subsequent cooling to impart at least a partial temper in the glass. Such excessive heating caused the glass sheets to develop a wavy appearance termed "roll ripple distortion". If the glass sheets were heated to a temperature below which roll ripple distortion occurred, each sheet was likely to cool to below a temperature suitable for tempering during the application of the coating composition and during the transfer of the coated glass sheets to the cooling station.

Furthermore, when spaced glass sheets are conveyed through successive heating, coating and cooling stations, it is necessary to coordinate an intermittent operation of composition application means for applying the coating composition that reacts on contacting a hot glass surface to form the coating as a reaction product as each glass sheet in turn is conveyed past the composition application means. This coordination comprises stopping the application means when said means faces spaces between successive glass sheets, and resuming operation of said application means whenever a glass sheet is aligned with said application means. Otherwise, spray composition is imparted to the spaces between the spaced glass sheets so as to deposit the coating composition on the conveyor rolls in the coating station of the roller hearth. Some of this coating that is deposited on the rolls transfers to the bottom surface of the glass sheets as the latter pass through the coating station. Usually, it is desired to maintain one of the glass sheet surfaces free of any coating, at least during the time that the upper surface of the glass is being coated. Therefore, the prior art technique required an additional step of removing the coating transferred to the glass sheet surface contacting the rotating conveyor rolls exposed to the composition when spaced glass sheets were coated.

It is also known to coat a newly formed continuous ribbon of float glass shortly after the latter leaves a ribbon forming chamber and before it enters an annealing chamber. A typical apparatus for performing such a method is disclosed in U.S. Pat. No. 3,652,246 to Joseph E. Michelotti and Vern A Henery. However, such an apparatus requires that the coated, continuous glass ribbon be annealed so as to enable the ribbon to be cut into discrete sheets after coating. Hence, such an apparatus would require a reheating and rechilling step in order to impart a temper to the coated glass.

In the past, it has been considered necessary to enclose the coating apparatus physically within closed solid barriers forming an enclosure around the coating station to protect the atmosphere in the vicinity of the coating station from contamination by any excess coating composition and reaction product not used to form the coating. Therefore, it was necessary in the past to dismantle at least part of the enclosure whenever it was necessary to service the composition application means, particularly the spray gun forming an essential part of a specific embodiment thereof. In order to avoid the need for such dismantling, the prior art has incorporated at a coating station exhaust ducts that direct excess spray originally imparted vertically downward from a spray gun in a vertically upward direction. Such an arrangement is relatively inefficient and can be improved.

It has also been conventional in the past to use gas curtains extending in vertical planes transverse to the conveyor path to define the upstream and downstream boundaries of the coating station. In the past, these gas curtains have used air at ambient temperature conditions. The combination of relatively cool air and relatively cool coating composition applied to the glass as in the prior art does not impair the coating unduly or cool the glass to a temperature unsuitable for commencing an annealing operation of the coated glass. However, the exposure of the moving glass sheets to two curtains of cool air and a cool coating composition may cause the glass sheets so treated to cool below a temperature suitable for imparting an adequate temper by subsequent rapid cooling.

It has been traditional in the flat glass industry to form a continuous ribbon of uncoated glass and cut the glass to individual discrete sheets having desired outlines of predetermined or preselected size before tempering the latter. The use of tongs to suspend glass sheets during thermal treatment involved in tempering has caused marking and distortion of the flat glass at the tong gripping points. Therefore, the flat glass industry has used roller hearths to convey individual glass sheets during thermal treatments needed to temper or to coat and heat strengthen said glass sheets. However, prior to the present invention, the flat glass industry still required a continuous roller hearth line that treated individual discrete flat glass sheets by successive heating, coating and tempering steps that was suitable for mass production that did not result in considerable glass sheet breakage and/or roll ripple distortion and/or inadequate tempering and/or the need to remove undesired coating from the undersurface of the glass in contact with the conveyor that transported the glass through the coating station, that provided more ready access to the spray gun and more efficient removal of spray at the coating station.

2. Description of the Prior Art

U.S. Pat. No. 3,652,246 to Joseph E. Michelotti and Vern A. Henery; U.S. Pat. No. 3,660,061 to Harold E. Donley, Raymond G. Rieser, and William E. Wagner; U.S. Pat. No. 3,679,386 to Akira Kushihashi and Koji Ikeda; U.S. Pat. No. 3,689,304 to Charles R. Bamford; and U.S. Pat. Nos. 3,841,858 and 3,887,349 to Naotomo Akashi and Kutsuji Fujimoto all disclose apparatus for coating a newly formed continuous ribbon of glass. The ribbon is annealed after it is coated so that it can be cut after it is coated. In order to temper annealed coated glass sheets, it has been necessary to reprocess the glass on another apparatus to reheat each glass sheet to tempering temperature followed by rapid cooling.

In the patents enumerated in the preceding paragraph, a spray gun applies a coating composition in a downward direction against the upper surface of a moving continuous glass ribbon and the spray gun is flanked by evacuation means that remove excess spray in an upward direction from the upper surface of the ribbon. The efficiency of such an arrangement leaves something to be desired.

In the aforesaid U.S. Pat. Nos. 3,689,304 and 3,887,349, air barriers are provided at the upstream and downstream boundaries of the coating station. It is assumed that the air supplied for such barriers is drawn from the surrounding atmosphere and therefore may shock the glass before the final cooling step of tempering, thus tending to cause breakage.

U.S. Pat. No. 3,185,586 to Arnold E. Saunders and William E. Wagner and U.S. Pat. No. 3,410,710 to John M. Mochel disclose compositions for coating discrete glass sheets that may be flat. Such compositions are typical of those that are applied in the practice of this invention and the disclosures of these patents are incorporated by reference to provide a disclosure of suitable coating compositions for performing the present invention.

U.S. Pat. No. 3,806,331 to Albert Bezombes discloses a roller hearth suitable for heating and chilling glass sheets that are discrete to impart a temper to individual flat glass sheets. This patent does not involve coating. U.S. Pat. No. 3,672,861 to George S. Ritter, Jr., and Frank J. Hymore is another patent disclosing a typical roller hearth operation for heating and cooling flat glass sheets in order to impart a temper without coating.

Various patents to conveyors have been granted in which glass sheets are conveyed at different speeds along different portions of the conveyor. These include U.S. Pat. No. 1,482,106 to Clarence W. Avery and Wenzel G. Vasey; U.S. Pat. No. 1,638,769 to Halbert K. Hitchcock; U.S. Pat. No. 1,848,102 to James C. Blair; U.S. Pat. No. 2,025,102 to Alfred L. Harrington; U.S. Pat. No. 3,452,865 to Anthony S. Brittain; U.S. Pat. No. 3,594,149 to Alan Pickavance and Ronald Charles Freestone and U.S. Pat. No. 3,792,993 to Arvi Artama and Erkki Artama. Other patents to conveyors which control the spacing between the work pieces other than glass sheets to be conveyed include U.S. Pat No. 1,457,352 to Charles H. Breher; U.S. Pat. No. 2,488,104 to Allan A. Tunley; U.S. Pat. No. 3,072,095 to Harold E. Keessen and William B. Morgan, Jr.; and U.S. Pat. No. 3,332,819 to Eugen Siempelkamp.

Despite the existence of so many patents relating to multiple speed conveyors for glass sheets and other articles, there was no patent available in the prior art to teach one skilled in the flat glass coating and tempering art how to coat and temper a series of flat glass sheets while moving the latter continuously on a roller hearth conveyor without obtaining an excessive amount of breakage or requiring the removal of a coating from the opposite surface from the surface desired to be coated, while avoiding roll ripple distortion and insufficient tempering and minimizing the amount of excess spray that escapes to the environment adjacent the coating station even though the latter is exposed so as to enable ready access to coating application equipment, such as spray guns, that require frequent maintenance.

In addition, the prior art patents lacked a teaching of glass sheet treatment in which continuously moving, discrete glass sheets are spaced apart while subjected to heating and cooling and brought into abutting relation for a coating step.

SUMMARY OF THE INVENTION

The present invention relates to the treatment of discrete flat glass sheets on a roller hearth to transform said sheets into coated glass sheets having a desired degree of temper and minimum roll ripple distortion.

In a specific embodiment, the present invention comprises conveying a series of discrete glass sheets along a straight line through a heating furnace, a coating station, a reheating station, and a cooling station. Each sheet in turn is heated in the furnace to a temperature sufficient for a coating composition to react to form a metal oxide coating on contacting the hot glass sheet surface when the sheet reaches the coating station. The coating composition is applied to the upper surface of each said glass sheet as the latter passes through the coating station at a temperature sufficient to form a metal oxide coating on the surface, thereby forming the coating on the upper surface and incidentally cooling the sheet to a temperature below a temperature suitable for tempering. Each coated glass sheet is reheated sufficiently to raise its temperature to one suitable for tempering, but insufficient to cause roll ripple distortion, when the sheet passes through the reheating station and each said sheet is rapidly cooled from the latter elevated temperature suitable for tempering at a rate sufficiently rapid to impart at least a partial temper in the coated sheet as the latter passes through the cooling station. The coating station is exposed to provide ready access for coating composition applicating means, such as a spray gun, when maintenance is required. Also, the coating station contains hot gas curtains at its upstream and downstream ends to minimize the amount of cooling of the glass at the coating station, thereby reducing the power needed to reheat the coated glass to a temperature adequate for tempering in the reheating station.

According to a specific embodiment of the present invention, the sheets are conveyed along the roller hearth conveyor at a non-uniform speed which includes a first speed during the heating step, a second speed slower than the first speed for sufficient time to abut the sheets together during the coating step, and a speed faster than the second speed to separate the coated glass sheets during the reheating and cooling steps.

The discrete glass sheets pass through the heating furnace in spaced relation to expose the edges of the sheets to the heat of the heating furnace so as to heal any vents that may exist in the cut edges of the individual discrete glass sheets. Then, when the individual sheets reach the coating station, they are in abutting relation to one another so as to avoid having any spaces between successive glass sheets through which the coating composition may be applied to the conveyor rolls. When the glass is reheated, the sheets separate to expose the edges to the hot atmosphere of the reheating station to further heal the edges if such healing is required. Furthermore, during the final cooling step when it is necessary not only to impart a rapid cooling to the edges to insure a strong edge but also to provide sufficient exhaust passages for removing the tempering medium used to cool the glass sheets, the sheets are separated from one another by even greater distances to provide large spaces between successive sheets for the escape of said tempering medium.

These and other features of the present invention will be readily understood in the light of a description of a preferred embodiment which follows.

BRIEF DESCRIPTION OF THE DRAWINGS

In the drawings wherein like reference numbers refer to like structural elements, and which forms part of the description of an illustrative embodiment of this invention, FIG. 1, comprising FIGS. 1a and 1b, represents a partial fragmentary plan view of apparatus for performing the method of the present invention including a continuous straight line conveyor extending through a heating furnace, a coating station, a reheating station, and a cooling station, with a portion of the heating furnace between FIGS. 1a and 1b omitted, and shows the arrangement of the glass sheets at different portions of the conveyor system;

FIGS. 2a and 2b are longitudinal side elevational views of the portions of the apparatus disclosed in plan in FIGS. 1a and 1b;

DESCRIPTION OF THE PREFERRED EMBODIMENT

Figure 3:
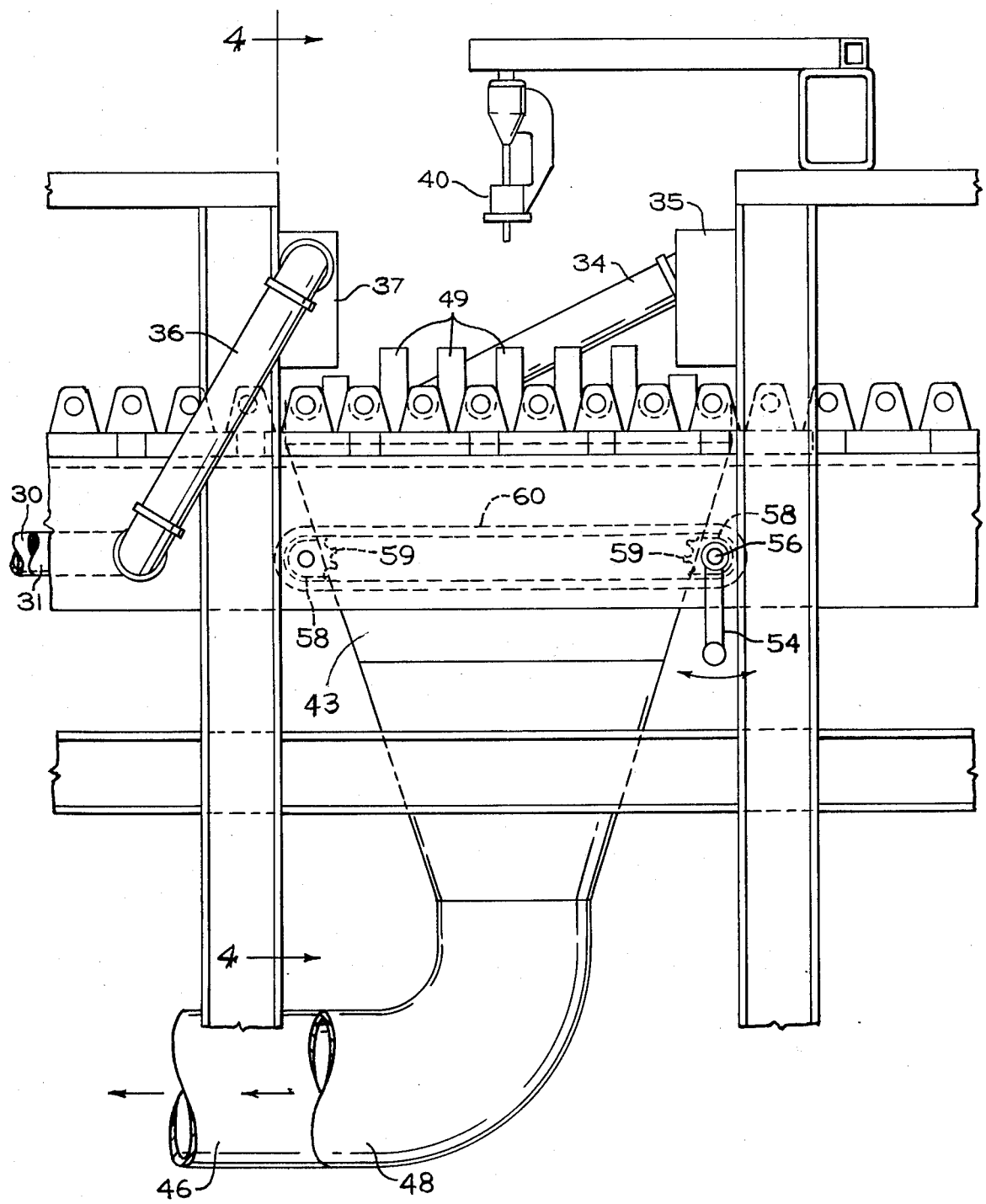
FIG. 3 is an enlarged side elevational view of a coating station forming part of the apparatus of FIGS. 1 and 2.
Figure 4:
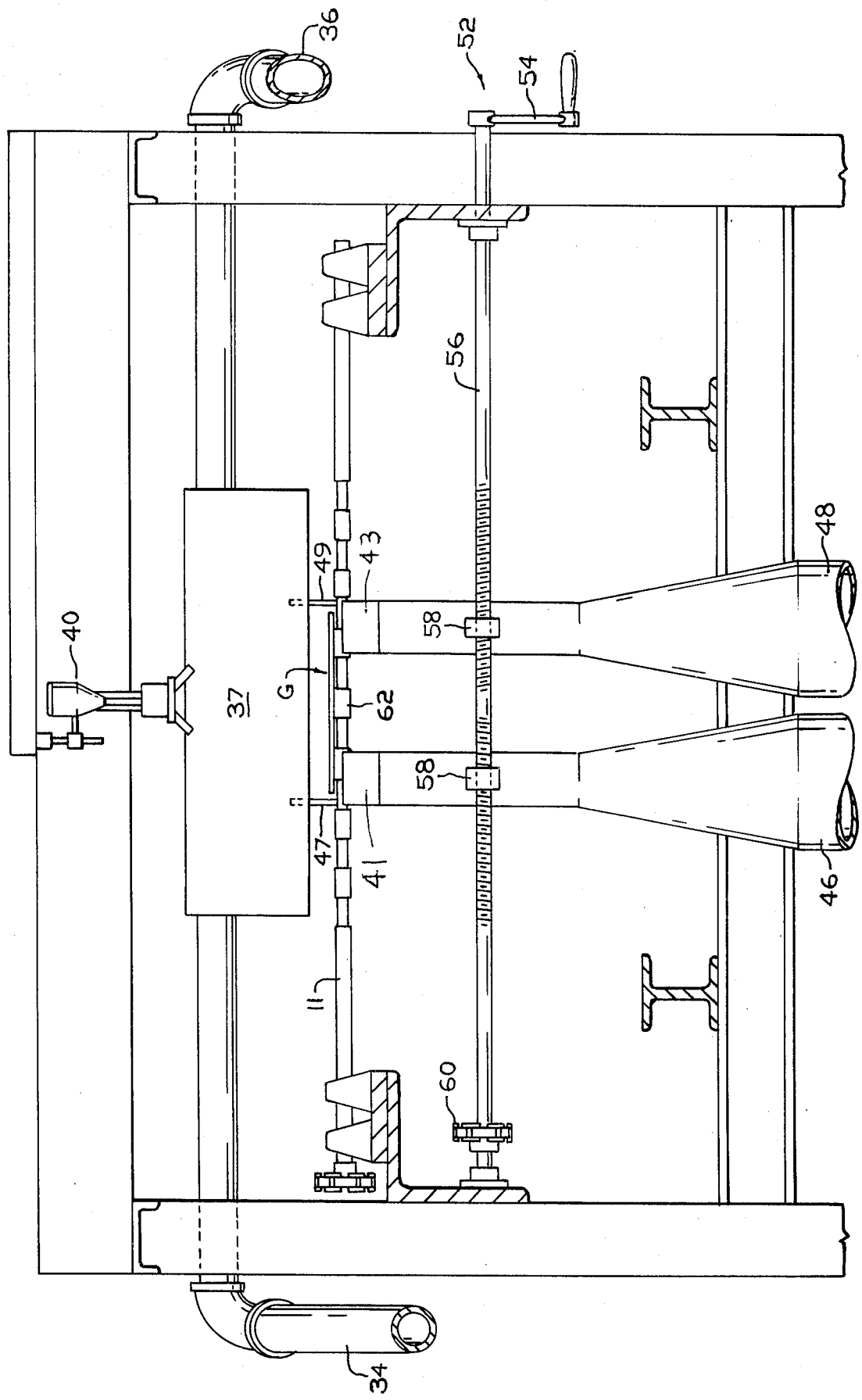
FIG. 4 is a sectional view taken along the lines 4—4 of FIG. 3.

Referring particularly to FIGS. 1a, 1b, 2a, and 2b, a preferred embodiment of the present invention comprises a conveyor system 10 consisting essentially of a plurality of series of conveyor rolls 11. The latter are arranged in groups and each extend transversely in longitudinally spaced relation to one another. As will be explained subsequently, each group is driven by a variable speed motor (not shown) in a manner well known in the art of transporting glass sheets. The conveyor system extends successively through a glass sheet loading station 12, a heating furnace 14, a coating station 16, a reheating station 18, a cooling station 20 and an unloading station 22.

The heating furnace 14 comprises a plurality of furnace sections 14A to 14E of equal length and an exit furnace section 14F of shorter length, whose downstream end is followed by the coating station 16. The reheating station 18 has a length equal to those of any furnace section 14A to 14E.

The conveyor rolls 11 of the various sections are rotated at various speeds so arranged that the individual discrete glass sheets are spaced during their passage through the heating furnace 14. The sheets are then brought into abutting relation when they arrive at the coating station 16 and then are reseparated at the reheating station 18 and separated to greater spaces at the cooling station 20 to provide coated, tempered, flat glass sheets at the unloading station 22.

While FIGS. 1a and 1b are separated from one another and similarly for FIGS. 2a and 2b, it is understood that the conveyor system depicted in FIGS. 1 and 2 is a continuous straight line conveyor system which enables a flat glass sheet to be loaded at the glass sheet loading station 12 and to be processed by being heated in spaced relation to one another while traversing the heating furnace 14, so that the heat of the furnace 14 is applied to the peripheral edge of each glass sheet so as to help heal any vents that may be present due to inadequate cutting of the glass into discrete sheets. The glass sheets are then conveyed at reduced speed in furnace section 14F and coating station 16 to bring adjacent glass sheets into abutting relation as the coating composition is applied at the coating station 16, so that the discrete glass sheets have the effect of a continuous ribbon to mask the conveyor rolls 11 in the coating station 16 from contact by the coating composition that is sprayed onto the upper surfaces of the glass sheets passing under composition aplication means in the form of a spray gun 40 at the coating station 16. The glass sheets, now coated, continue through the reheating station 18, where their speed is increased so as to separate the coated glass sheets, thereby enabling additional heat to be imparted to the edges to further protect the edges and provide additional healing, if necessary.

The glass sheets G are further accelerated when they enter the cooling station 20 so as to separate the discrete glass sheets from one another still further, thereby leaving room for the escape of tempering medium which is used to quench or cool the reheated glass sheets very rapidly to impart at least a partial temper thereto.

The preferred embodiment of the present invention also comprises a fan motor 24 disposed near the entrance to the furnace. The fan motor 24 operates a fan 26 which forces air under pressure into an air conduit 28. The air conduit is connected to a pair of air pipes 30 and 31 which extend along the entire length of the furnace 14 so that air supplied under pressure from the fan 26 travels through the air pipes 30 and 31 along the entire length of the furnace. During the course of this travel, the air is heated by heat exchange with the hot atmosphere of the furnace. Each of the air pipes 30 and 31 is provided with a valve 32 to control the rate of air flow along the length of the particular air pipe.

Air pipe 30 is provided with an extension 34 leading into an upstream hot air curtain box 35. Similarly, air pipe 31 is provided with an extension 36 that connects the air pipe 31 to a downstream hot air curtain box 37. Each of the hot air curtain boxes is aligned with one another longitudinally of the central portion of conveyor rolls 11 in the coating station 16 and is provided with an elongated slot (not shown) through which a curtain of hot air is applied downwardly across longitudinally spaced lines extending transversely of the central portion of the conveyor. Hot air curtain box 35 supplies a hot air curtain at the downstream exit and of the coating station 16, while hot air curtain box 37 supplies another hot air curtain at the upstream entrance end of the coating station. In this manner, the upstream and downstream boundaries of the coating station 16 are defined by hot air curtains emanating from the slots at the bottom of the downstream hot air curtain box 35 and the upstream hot air curtain box 37.

A coating composition application means in the form of a spray gun 40 is provided in the geographical center of the coating station 16 when the coating station is used to coat glass sheets having a width up to about 50 centimeters. The spray gun 40 is shown as being mounted rigidly above the path of glass sheet movement defined by the conveyor system 10. However, it may be mounted to reciprocate transversely of the path of glass sheet movement defined by the conveyor system 10 as is well known in the art when glass sheets having larger width dimensions are being processed. As an alternative the spray gun may be reciprocated in the manner depicted in U.S. Pat. No. 3,796,184 to Charles P. Hawkins. As another alternative, a plurality of spray guns may be provided at the coating station 16 in the manner depicted in U.S. Pat. No. 3,885,066 to Ronald L. Schwenninger, for example. The spray gun is constructed and arranged to apply a coating composition in a direction having a vertical component of motion in the downward direction.

A vacuum exhaust motor 42 communicating with a vacuum exhaust stack 44, exhausts air through a filter 45 from evacuation passages 46 and 48 connecting downwardly directed exhaust chambers 41 and 43 to the stack 44. The exhaust chambers have elevated, discontinuous laterally outer walls 47 and 49. The evacuation passages 46 and 48 extend generally parallel to one another and are of flexible material so that their position can be modified. The outer walls 47 and 49 have spaced cut-outs aligned with one another at their upper portions to provide clearance for a plurality of the conveyor rolls 11 located in the vicinity of the coating station 16.

Position adjustment means 52 is provided to adjust the locations of the exhaust chambers 41 and 43 and their laterally outer walls 47 and 49 to provide means for adjusting the width of the coating station 16 so that the distance between the outer wall 47 and the outer wall 49 is slightly more than the width of glass sheets G being processed. The position adjustment means 52 comprises a crank 54 fixed to one of two turnbuckle rods 56. The turnbuckle rods 56 are threadedly engaged with internally threaded brackets 58, two of which are carried by each of the exhaust chambers 41 and 43. The turnbuckle rods 56 are fixed at one common end opposite the end attached to crank 54 of one of the turnbuckle rods 56 to sprockets 59 which are interconnected through a chain drive 60. Thus, the crank 54 rotates in one direction to separate the outer walls 47 and 49 from one another to accommodate wider glass sheets to be processed at the coating station 16 and rotates in the opposite direction to move the outer walls 47 and 49 toward one another when it is desired to accommodate narrower glass sheets.

The conveyor rolls 11 in the coating station 16 are provided with spaced sleeves 62, which are axially spaced along the length of the conveyor rolls 11. Their position may be adjusted to accommodate different glass sheets so that the sleeves 62 support the main portion of the glass sheet and leave the longitudinally extending side edges of the glass sheets in spaced relation above the conveyor rolls 11, thereby leaving spaces between the exhaust passages 41 and 43 and conveyor rolls 11.

The cooling station 20 comprises a plurality of upper manifolds 64 communicating cold air under pressure from upper feed pipes 65 to the upper surface of the reheated glass sheets and lower manifolds 66 communicating cold air under pressure from lower feed pipes 67 to the lower surface of the reheated glass sheets. The upper manifolds 64 are provided with a series of elongated slot-type nozzles whose openings face downward toward the elongated, transversely extending spaces between the adjacent conveyor rolls 11 of the cooling station 20. The lower manifolds are provided with a plurality of slot-type nozzles whose openings face upward toward the space from sites below the adjacent conveyor rolls 11. The arrangement of the slotted nozzles relative to the conveyor rolls is similar to that disclosed in greater detail in U.S. Pat. No. 3,881,907 to Eugene W. Starr as conventional glass sheet cooling nozzles disposed beyond the first row of modules in the apparatus disclosed therein. Since the construction and arrangement of nozzles in air cooling devices for cooling flat glass sheets to be tempered is well known, a detailed description is not provided in this specification for sake of brevity.

In a typical operation for making tempered, coated, glass sheet oven windows, glass sheets 7 inches (17.8 centimeters) wide by 16 inches (40.6 centimeters) long and 3/16 inch (4.6 millimeters) thick, the conveyor sections were run according to the following program:

| CONVEYOR SECTION | SPEED (Inches Per Minute/ Centimeters Per Minute) |
| --- | --- |
| Loading Station 12 | 200/548 |
| Furnace Sections 14A to Part of 14E | 240/650 |
| Rest of 14E, All of 14F and Coating Station 16 | 200/548 |
| Reheating Station 18 | 240/650 |
| Cooling Station 20 | 440/1117 |

Each of the furnace sections 14A to 14E and the reheating station 18 are 10 feet (304.8 centimeters) long. The exit furnace section 14F is about 1 foot (30 centimeters) long and has glass sheet measuring instruments within an enclosed area. The interior furnace cavity is about 2 feet (about 60 centimeters) wide.

In order to have glass sheets leave furnace section 14F at a temperature within the range of 1200° F. ± 20° F. (660° C. ± 11° C.), the furnace sections 14A – 14E are each provided with a bank of four sets of electrical resistance heaters supported from the roof of the furnace, each set in each furnace section being controlled by rheostat settings arranged to provide a preselected percentage setting based on 100 percent for the power needed to supply the zone temperature. The reheating furnace has a single set of resistances supported from its roof and adjustable to provide an overhead radiant heat source at a temperature that can be controlled.

The following chart is one that is used with the conveyor speed arrangement recited previously for the typical operation:

| FURNACE SECTION | SET POINT ° F. | ° C. | RHEOSTAT SETTINGS LEFT SIDE | LEFT CENTER | RIGHT CENTER | RIGHT SIDE |
|---|---|---|---|---|---|---|
| 14A | 1600 | 871 | 100% | 100% | 100% | 100% |
| 14B | 1600 | 871 | 90% | 100% | 100% | 90% |
| 14C | 1600 | 871 | 75% | 85% | 85% | 75% |
| 14D | 1510 | 821 | 75% | 85% | 85% | 75% |
| 14E | 1500 | 816 | 65% | 70% | 70% | 65% |
| 14F | | | NO HEAT APPLIED | | | |
| 18 | 1465 | 796 | NO RHEOSTAT SETTINGS | | | |

The coating station 16 is about 2 feet (about 60 centimeters) long and comprises an open space about 18 inches (about 45 centimeters) long flanked by the upstream hot air curtain box 35 and the downstream hot air curtain box 37. Each box extends 3 inches (7.6 centimeters) along the length of the conveyor system 10. The spray gun 40 is mounted in fixed position in the geographical center of the coating station 16 above the path of glass travel to apply a spray in a vertically downward direction. The preferred embodiment has a Binks Model 21 spray gun supplied with air at a pressure of 110 psi (537 kilograms per square meter), atomizing air at a pressure of 30 pounds per square inch (146 kilograms per square meter) and coating composition at a pressure of 5 pounds per square inch (24 kilograms per square meter). The elongated exhaust chambers 41 and 43 have sufficient vertical dimensions to remove excess spray of coating composition in the same direction at which the spray is applied to the upper surface of the abutting glass sheets. When the spray is applied downward, both inertia and gravity contribute to the ready removal of the excess spray from the coating station 16 to the exhaust chambers 41 and 43.

In the cooling station 20, air is supplied through the first two rows of nozzles at a pressure of 22 ounces per square inch directed downwardly through the upper nozzles (6.7 kilograms per square meter), and 16 ounces per square inch (4.9 kilograms per square meter) directed upwardly through the bottom set of nozzles. In the next five rows of nozzles, the air blasts are directed downwardly at a pressure of 30 ounces per square inch (9.1 kilograms per square meter) through the top slot nozzles and 27 ounces per square inch (8.2 kilograms per square meter) directed upwardly through the opposing nozzles. The next seven rows of nozzles are provided with air blasts at a pressure of 20 ounces per square inch (6.1 kilograms per square meter) through the top nozzles directed downward and 10 ounces per square inch (3.1 kilograms per square meter) directed upwardly through the lower nozzles. The glass at this point is sufficiently tempered so that the remaining nozzles merely provide additional cooling to facilitate handling.

A typical spray composition used in the coating station to provide transparent electroconductive tin oxide coatings may be found in U.S. Pat. No. 3,107,177 to Arnold E. Saunders and William E. Wagner. A typical composition contains 18,924 milliliters of dibutyl tin diacetate, 15,896 milliliters of 30% HF in methanol, 14,382 milliliters of triethylamine and 100 grams (250 milliliters) of ahydrous ethylamine.

According to a typical mode of operation, the glass sheets are mounted in either abutting relation to one another as depicted in the left hand end of FIGS. 1a and 2a or very closely adjacent to one another at the glass sheet loading station 12. As the sheet reaches the higher speed conveyor section extending through the furnace, the sheets tend to separate to provide a space S between adjacent glass sheets G so as to expose the entire peripheral edge of the glass to the elevated ambient temperature of the furnace 14. The glass sheets remain separated until they approach the exit portion of the furnace 14 where the third conveyor section having the same speed as in the loading station is located. Thus, the glass sheets gradually approach one another until the trailing edge of each glass sheet that leaves the furnace exit is abutted by the leading edge of the succeeding glass sheet. Thus, the glass sheets form a substantially continuous series of discrete abutting glass sheets as they pass through the coating station 16. When the coated glass sheets enter the reheating station 18, they transfer to conveyor rolls rotating at a higher speed, so that the sheets separate from one another and provide spaces S between adjacent sheets. When the sheets leave the reheating station 18 and enter the cooling station 20 they are conveyed by additional conveyor rolls 11 rotated at a still higher speed so as to separate the glass sheets further from one another, thereby leaving more space between successive sheets for tempering medium, such as air blasts imparted against the upper and lower glass sheet surfaces through the slot type nozzles at the extremities of the upper and lower manifolds 64 and 66, to escape more readily and permit fresh cool air to be blasted against the glass sheet surfaces.

The use of the hot air curtains has reduced the rate of glass sheet breakage compared to that experienced when the curtains contained air at ambient conditions or when curtains were absent.

It has been found desirable to control the temperature to which the coated glass sheets are reheated to a temperature range that departs slightly from the temperature to which the glass was heated prior to the application of the coating composition at the coating station 16. This range is preferably 0° to 20° F. (0° – 11° C.) different from the temperature at which spraying commences. It has been found that if the glass sheet is reheated to a temperature more different from the temperature at which the coating composition was applied, that the coating tends to craze.

Using a Binks Model 21 spray gun provided with a 63 SK air cap and a 63 fluid nozzle and a 263 needle providing a tank pressure of 3.75 psi (18 kilograms per square meter), an atomizing pressure 30 psi (146 kilograms per square meter) and a flow rate of 96 cubic centimeters per minute of the typical composition recited previously, produced a tin oxide coating composition having a surface resistivity of 16 ohms per unit square. The thickness of the glass sheet determines the optimum speed through the furnace 14, the coating station 16, and the cooling station 20. It is understood that the speed through the reheating station 18 is assumed to be the same as the speed through the heating furnace 14, although this is not necessarily required in the broadest aspect of the present invention.

For glass sheets having a nominal thickness of 1/8 inch (3 millimeters) treated in another furnace a speed of 17.0 feet per minute (8.6 centimeters per second) through the furnace 14, a speed of 16.6 feet per minute (8.3 centimeters per second) through the coating station 16, and a speed of 19.2 feet per minute (9.7 centimeters per second) through the cooling station 20 provided suitable results. In addition, for the same setting of heat in the furnace 14 and the reheating station 18, a speed of 15.4 feet per minute (7.8 centimeters per second) through the furnace 14, a speed of 15.0 feet per minute (7.6 centimeters per second) through the coating station 16 and a speed of 19.2 feet per minute (9.7 centimeters per second) provided adequate results for glass sheets having a nominal thickness of 3/16 inch (4.6 millimeters), The form of the invention shown and described in this disclosure represents an illustrative preferred embodiment thereof. It is understood that various changes may be made in dimensions, in rates of heating and applying coating compositon and in relative rates of speed and temperature and other parameters, such as applying the coating composition with a vertically upward component of motion in combination with suction means provided with exhaust chambers arranged to provide suction in a upward direction to benefit from the effect of inertia of the application of the coating composition, and supplying heat from the reheating station 18 in whole or in part to one or both hot air curtain boxes 35 and/or 37, for example, as well as other variations that may become obvious in the light of this description without departing from the gist of the invention as defined in the claimed subject matter which follows.

I claim:
1. A method of treating a series of discrete glass sheets comprising:
   a. conveying a series of discrete glass sheets on a roller conveyor along a straight line path through a heating furnace, a coating station, a reheating station and a cooling station;
   b. heating each sheet in turn to a temperature sufficient for a coating composition to react to form a metal oxide coating when it contacts the heated glass sheet surface when said glass sheet is conveyed through said coating station;
   c. applying said coating composition to the upper surface of each said glass sheet as the latter passes through said coating station at a temperature sufficient to form a metal oxide coating on said surface, thereby forming said coating on said upper surface and incidentally cooling said sheet to a temperature below a temperature suitable for tempering;
   d. reheating each said coated glass sheet sufficiently to raise its temperature to one suitable for tempering but below a temperature at which significant roll ripple distortion results when said sheet passes through said reheating station, and
   e. cooling each said sheet from said temperature suitable for tempering at a rate sufficiently rapid to impart at least a partial temper in said sheet as the latter passes through said cooling station.

2. A method as in claim 1, wherein said sheets are conveyed at a non-uniform speed including a first speed during said heating, a second speed slower than said first speed prior to and during said conveyance through said coating station so that successive of said sheets abut one another during said application of said metal composition and a speed faster than said second speed during said reheating and cooling steps so that said successive sheets are separated from one another during said reheating and cooling steps.

3. A method as in claim 2, wherein said sheets are conveyed in spaced relation during said heating, in abutting relation during said application of said coating composition and in spaced relation during said reheating and cooling.

4. A method as in claim 3, wherein said sheets are conveyed in abutting relation toward said heating furnace and each sheet in turn is separated from its succeeding sheet in said series to be spaced therefrom within said heating furnace.

5. A method as in claim 1, wherein said coating composition is applied in the form of a spray in a direction having a vertical component of motion against a major surface of said moving glass sheets from a source spaced from said path and suction is applied in said direction of said component of motion along elongated areas in the vicinity of the opposite longitudinal side edges of said moving glass sheets to remove excess spray from said coating station and reducing the amount of said excess spray that escapes to the environment adjacent said coating station compared to said amount that would escape if said suction were applied in the opposite direction or not at all.

6. A method as in claim 5, wherein said coating composition is applied in a direction having a vertically downward component to the upper major surface of said moving glass sheets and said suction is applied in said direction to enable gravity to assist said suction to remove said excess spray.

7. A method as in claim 6, wherein said coating composition is applied as said glass sheets are conveyed between a pair of hot gas curtains disposed in planes normal to said path of glass sheet movement and extending completely across the width of said glass sheets.

8. A method of coating a glass sheet moving along a horizontal path comprising applying a coating composition from a source vertically spaced from said path in a direction having a vertical component of motion to a major surface of said glass sheet as it moves between a pair of hot gas curtains disposed in planes normal to said path of glass sheet movement and extending completely across the width of said glass sheet, and applying suction in the direction of said component of coating movement along elongated areas in the vicinity of the opposite longitudinal side edges of said glass sheet along the portion of said path extending between said hot gas curtains to evacuate excess reaction product that results from the application of said coating composition.

9. A method of coating as in claim 8, comprising conveying a plurality of glass sheets along said horizontal path in abutting relation to one another between said hot gas curtains.

10. A method as in claim 9, including applying said coating composition from a source located above said path in a direction having a vertically downward component of motion onto the upper surface of said abutting glass sheets and applying said suction in the direction of said component as said sheets move along said path between said hot gas curtains.

11. A method as in claim 9, including applying said coating composition from a source below said path onto the lower surface of said abutting glass sheets and applying said suction in an upward direction as said sheets move along said path between said hot gas curtains.

12. A method as in claim 9, further including filtering the evacuated reaction product to remove any undesirable contaminants and passing the filtered product with a reduced concentration of contaminants therein to the atmosphere.

13. A method as in claim 9, wherein said coating composition is applied within an exposed volume having one pair of opposite ends defined by longitudinally spaced vertical planes containing said hot gas curtains and another pair of opposite ends defined by laterally spaced vertical planes containing said elongated areas of evacuation.

14. A method as in claim 8, including spraying said coating composition from a source above said path in a vertically downward direction onto the upper surface of said abutting glass sheets and applying said suction in said downward direction as said sheets move along said path between said hot gas curtains.

15. A method as in claim 8, including spraying said coating composition from a source below said path in an upward direction onto the lower surface of said abutting glass sheets and applying said suction in an upward direction as said sheets move along said path between said hot gas curtains.

16. A method as in claim 14, further including filtering the evacuated reaction product to remove any undesirable contaminants and passing the filtered product with a reduced concentration of contaminants therein to the atmosphere.

17. A method as in claim 8, wherein said coating composition is sprayed within an exposed volume having one pair of opposite ends defined by longitudinally spaced vertical planes containing said hot gas curtains and another pair of opposite ends defined by laterally spaced vertical planes containing said elongated areas of evacuation.

18. Apparatus to coat the upper surface of a series of moving sheets comprising a conveyor comprising a plurality of spaced aligned conveyor rolls defining a substantially horizontal path of travel, spray means disposed above said conveyor for applying a coating composition in a downward direction toward said upper surfaces, said spray means being located within an exposed coating station, said exposed coating station comprising hot air curtains intersecting said conveyor at the upstream and downstreams ends of said coating station to define the upstream and downstream ends of said coating station, and laterally spaced evacuation means constructed and arranged to evacuate fluid downwardly and extending longitudinally of said conveyor in spaced paths parallel to said conveyor path and extending between said hot air curtains to define the lateral sides of said exposed coating station.

19. Apparatus as in claim 18, wherein said coating station is located between a pair of furnace sections, and means is provided to supply hot gas from gas supply means in heat exchanging relation with at least one of said furnace sections to said hot air curtains.

20. Apparatus as in claim 18, wherein each said evacuation means comprises a laterally outer wall having a plurality of discontinuities at its upper portion aligned with corresponding discontinuities of the laterally outer wall of said other evacuation means to provide clearance for a plurality of said conveyor rolls.

21. Apparatus as in claim 20, further including means to adjust the distance between said evacuation means to correlate said distance with the width of said sheets.

* * * * *